No. 663,594. Patented Dec. 11, 1900.
R. A. WORSTALL & C. F. HACKATHORN.
PROCESS OF MAKING VARNISH.
(Application filed June 12, 1900.)
(No Model.)
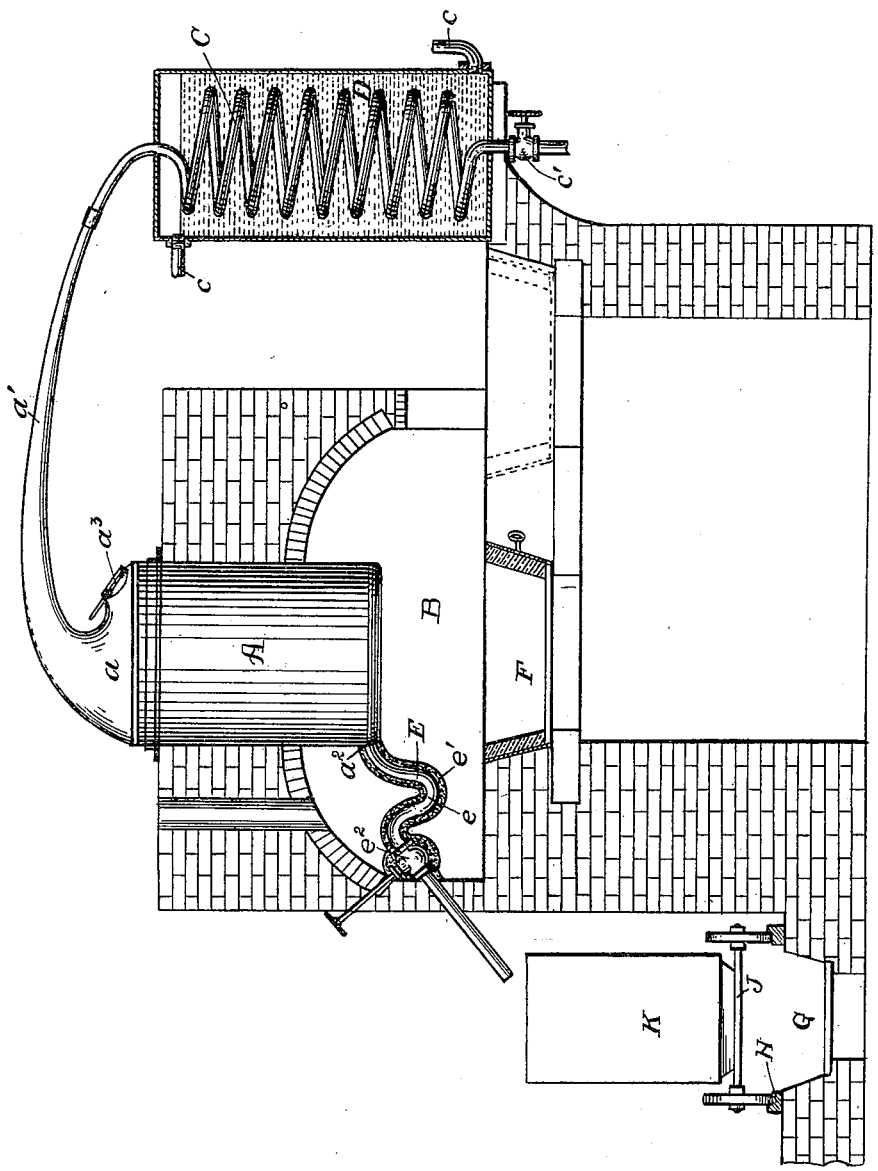
Witnesses
J. C. Turner
N. E. Merkel
Inventors
R. A. Worstall
C. F. Hackathorn
By J. D. Fay, Atty.

UNITED STATES PATENT OFFICE.

ROBERT A. WORSTALL AND CHARLES F. HACKATHORN, OF CLEVELAND, OHIO.

PROCESS OF MAKING VARNISH.

SPECIFICATION forming part of Letters Patent No. 663,594, dated December 11, 1900.

Application filed June 12, 1900. Serial No. 20,014. (No specimens.)

*To all whom it may concern:*

Be it known that we, ROBERT A. WORSTALL and CHARLES F. HACKATHORN, citizens of the United States, and residents of Cleveland, county of Cuyahoga, and State of Ohio, have invented a new and useful Improvement in Processes of Manufacturing Varnish, of which the following is a specification, the principle of the invention being herein explained and the best mode in which we have contemplated applying that principle, so as to distinguish it from other inventions.

Our invention relates to a process of manufacturing varnish; and it consists of steps in such process hereinafter fully described.

In the ordinary method of manufacturing varnish the gum or resin used is placed in a suitable kettle and heated until it is fused to a limpid liquid, whereupon a suitable vehicle, such as linseed-oil, is added in suitable quantity and the mixture then thinned down to the proper body by the addition of turpentine or other suitable reducer. In the case of spirit-varnish the fused gum or resin is dissolved in the proper spirit. In any case it has been found that the fusion of the gum or resin is necessary in order to cause it to properly dissolve in a solvent.

In order to produce a varnish which after being made will not resolve itself into its original constituents and which will embody and maintain the required luster, hardness, durability, and elasticity, the heating operation during fusing must be carried to just the proper degree. Such degree is determined to a slight extent by the temperature used in melting, but with greater accuracy by the consistency of the melted mass, as evidenced by the manner in which it drops from a stirrer or ladle. Such determination hence depends very largely upon the skill and judgment of an operator, and the accuracy of determination involves a great degree of experience in the art and the consequent employment of highly-skilled artisans. The end point of fusion depending then upon the mental judgment of an individual, it is impossible to obtain uniformly homogeneous results. Moreover, the constituents of the charge have varying points of fusibility, the finer particles melting first, so that the heating of the entire mass to the exact point required will involve either the underheating of one portion, the overheating of another, or vice versa, or both. It is therefore impossible by such usual method of procedure to bring the entire mass to the proper point in their fusion at the same time, which condition would be necessary in such method in order to produce the best possible results. The overheating of the melt causes the product to suffer in luster, hardness, durability, and elasticity, and the underheating results in a subsequent separation of the varnish into its constituent parts. It has hence been necessary to carry the heating operation to a point which will involve the least sacrifice in the required degrees of the several qualifications of a marketable varnish.

Of the gums or resins which are now used in the manufacture of varnish certain of the constituents have a comparatively low point of volatilization, so that the proper melting of the charge involves the volatilization of such constituents and a consequent loss of these volatile constituents. This loss has been found in practice to amount to from ten to forty-five per cent. of the weight of the gum in volatile and condensable oils.

Our invention, however, is designed to eliminate the difficulties above described and to save these valuable volatile substances.

The annexed drawing and the following description set forth in detail one mode of carrying out our invention, such disclosed mode constituting but one of various ways in which the principle of the invention may be used.

In said annexed drawing the figure represents a sectional view of one form of apparatus used for carrying out our invention, showing portions in elevation.

Said apparatus embodies a kettle or still A, suitably mounted in a heating-chamber B and having an air-tight removable top or cover *a*. Said cover is provided with an exit-tube *a'*, the extremity of which is removably secured to a worm C, located in a water-chamber D, through which chamber a supply of water is kept circulating by means of suitable supply-pipes *c c*. The lower end of said worm discharges at a suitably-accessible point and is provided with a suitable valve $c'$. The bottom of the still is provided with a discharge-opening $a^2$, to which is attached a discharge-pipe E, passing through the heating-chamber and the adjacent side wall thereof and provided with a siphon $e$, located within said chamber. Said discharge-pipe within said chamber is provided with an asbestos covering $e'$ and a closure-valve $e^2$, whose stem passes out through the supporting-walls and is thus rendered accessible. Beneath the still is a fire-box F, and below the outer end of the discharge-pipe E is a second fire-box G, embraced between the rails of a track H, upon which latter runs a truck J, supporting a kettle K.

The cover $a$ is provided with an opening $a^3$ for the introduction of a stirrer and having a sliding cover or valve for controlling communication with the interior of the still through such opening.

The desired charge of gum or resin is placed in the still through the opening made by removing the cover $a$, such cover then being replaced and the extremity of the exit-tube $a'$ connected with the upper end of the worm C. The proper amount of linseed-oil or other drying-oil is brought beneath the extremity of the discharge-pipe and over the fire-box G in the movable kettle K. In the case of linseed-oil or other similar oil the contents of the kettle are heated to a temperature of 350° or more, we having found in practice that a temperature of about 450° is most advantageous. Such required temperature of the drying-oil is maintained. Heat is now applied to the material in the still. It has been found in practice that the proper point of heat is reached as soon as the gum or resin becomes limpid and hence as soon as it flows readily. The valve $e^2$ is kept open or closed, its position depending upon the hardness and fusibility of the charge. It has been found in practice that it is most advantageous to leave the valve open in the case of soft easily-fusible gum or resins and to close same when hard difficultly-fusible material is used, opening the valve from time to time until limpid gum begins to run through, when it is opened wide and permitted to remain so. The heating operation being permitted to progress, the gum or resin melts and flows down into the siphon, through which it cannot, however, pass until it has become limpid—that is, until it has reached its proper heat. Upon reaching such point it discharges itself from the end of the discharge-pipe into the hot oil or other solvent ready to receive it. The two ingredients are stirred and combine readily, the gum or resin becoming incorporated in the solvent. It is hence seen that the charge cannot become overheated or underheated. If underheated, it will not flow, and it is impossible to overheat, inasmuch as it discharges itself immediately upon reaching its proper point in the heat.

The vaporous products resulting from the volatilization of the constituents of the charge during the heating operation pass up into the exit-tube and over into the worm, where they are condensed, the resulting distillate being drawn off through the valve. The charge having been heated, as above described, this distillate is the product of a process of heating in which the length of time of heating is automatically determined and not permitted to extend beyond that required to cause the charge to freely flow and wherein no portion of such charge is permitted to become overheated. The distillate so obtained is hence characteristically and essentially different from that produced when the heating process is not conducted as above described, no pyrogenic vapors being formed through overheating of any part of the charge. Said distillate being characterized as above stated has been found to be clear, bright, and to possess the characteristic odor of the gum or resin that yields it. Upon its formation it is collected and treated as by settling, so as to separate the water. The water being so removed, the density and other properties of the distillate are now found to be nearly those of turpentine, and it may hence be used for reducing the varnish. The distillate is after the above treatment so used and is incoporated in the mixture of oil and melted gum for reducing same, thereby materially reducing the cost of manufacture of the varnish by entirely eliminating the heretofore existing necessity of employing a separate and independent reducer and increasing the yield of varnish from a given weight of the charge. In this manner practically no part of the charge is lost and a varnish having the best characteristics possible to be made from the quality of gum used is obtained.

Other modes of applying the principle of our invention may be employed instead of the one explained, change being made as regards the steps herein disclosed, provided the step or steps covered by any one of the following claims be employed.

We therefore particularly point out and distinctly claim as our invention—

1. The steps in a process of manufacturing varnish, which consist in subjecting gum or resin to the action of heat while in a receptacle, such heat being applied in a degree sufficient to reduce such gum or resin to a state of fluidity; and automatically removing same from the source of heat as fast as it becomes sufficiently fluid to flow freely.

2. The combination of the steps in a process of manufacturing varnish, which consist in subjecting gum or resin to the action of heat, such heat being applied in a degree such as to reduce such gum or resin to a state of fluidity; automatically removing same from the source of heat as fast as it becomes sufficiently fluid to flow freely; condensing the vapors of the gum or resin formed during such heating, and incorporating the distillate so formed in the removed gum or resin.

3. The combination of the steps in a process of manufacturing varnish, which consist in subjecting gum or resin to the action of heat, such heat being applied in a degree such as to reduce such gum or resin to a state of fluidity; automatically removing same from the source of heat as fast as it becomes sufficiently fluid to flow freely; condensing the vapors of the gum or resin formed during such heating; discharging such fluid gum or resin into heated oil, and incorporating the distillate formed by condensation of such vapors into the mixture of oil and gum or resin.

Signed by us this 5th day of June, 1900.

ROBERT A. WORSTALL.
CHAS. F. HACKATHORN.

Attest:
   D. T. DAVIES,
   A. E. MERKEL.